E. A. SMITH.
Chain-Link for Horse-Power.

No. 206,273.  Patented July 23, 1878.

WITNESSES:
C. Neveux
C. Sedgwick

INVENTOR:
E. A. Smith
BY Munn & Co
ATTORNEYS.

N. PETERS, PHOTO-LITHOGRAPHER, WASHINGTON, D. C.

UNITED STATES PATENT OFFICE.

EDWARD A. SMITH, OF ST. ALBANS, VERMONT.

IMPROVEMENT IN CHAIN-LINKS FOR HORSE-POWERS.

Specification forming part of Letters Patent No. 206,273, dated July 23, 1878; application filed June 15, 1878.

*To all whom it may concern:*

Be it known that I, EDWARD A. SMITH, of St. Albans, in the county of Franklin and State of Vermont, have invented a new and useful Improvement in Links for Endless-Chain Horse-Powers, of which the following is a specification:

My invention relates to the construction of the links of the endless chains which pass around pulleys or rollers at the ends of a framework, and engage with gearing for the purpose of imparting motion to machinery of various kinds.

The invention consists in a novel construction and form of a cast-metal rack or bar provided with gear-teeth, and of a steel strap provided with bearings for pivots or bolts; and also in a novel mode or process of attaching and combining said bar and strap to form a link, whereby simplicity and economy of construction are obtained, and a strong, durable, and reliable link is produced.

Heretofore links for endless-chain horse-powers have been made of wrought metal by corrugating a strip or strap to form cogs or teeth for engagement with the gearing, and to form rings or eyes to serve as sockets for engagement with pivots or bolts for connecting said links together to form a chain.

In some cases the strip or strap of metal, after forming the teeth and the rings or eyes, is bent with the ends toward each other until said ends meet or pass and lap one over the other, so as to form a loop or band, in which the ends of the tread-boards are inserted and secured.

It has also been customary to make the link with a cast-metal body and a wrought-metal back, in which case the strip or strap for the back has had its ends curved to form sockets for the pivots or bolts, with transverse pins in said ends, and said back has been placed in the mold and cast fast to the cast-metal body.

My invention differs from those above referred to both in the construction and form of the parts composing the link and in the mode of attaching said parts together. The cast-metal toothed bar is formed with a rib or fin on its back or upper surface, with two extensions or projections near its ends, and the steel strap is provided with three slots or openings exactly corresponding in shape and dimensions with said fin and extensions.

The toothed bar is cast separately and allowed to cool, after which the strap, having its ends bent or curved to form hinge-sockets, is heated, and then placed in position on the bar, where it shrinks, and is held firmly and securely in place.

The accompanying drawing illustrates the manner of carrying out my invention.

Figure 1:
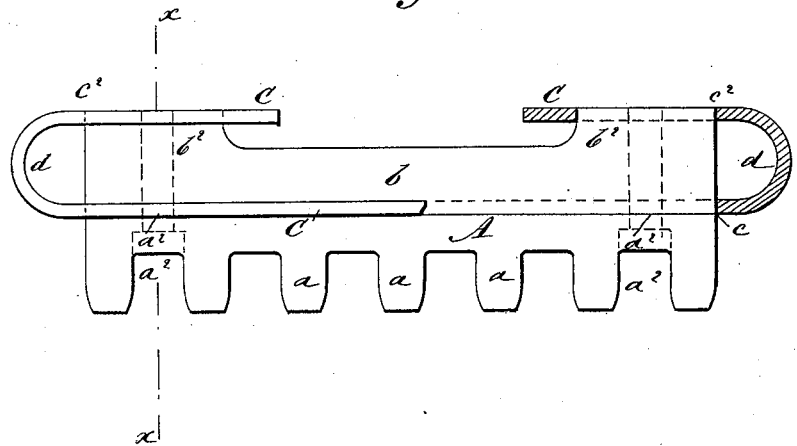
Figure 2:
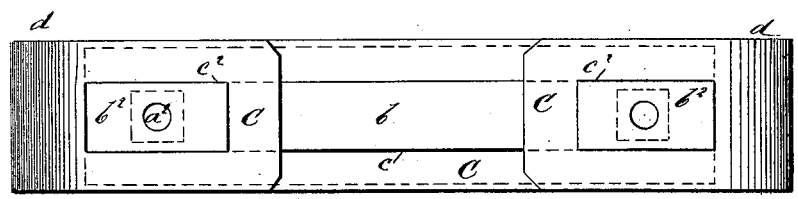
Figure 3:
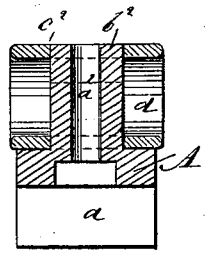

Figure 1 is a side view, partly in section, of a link constructed according to my invention. Fig. 2 is a top view of the same. Fig. 3 is a transverse section taken in the line $x\,x$ of Fig. 1.

Similar letters of reference indicate corresponding parts.

The cast-metal rack or toothed bar A is formed with teeth $a$ on its under surface, and with holes $a^2$ near its ends for the reception of bolts to fasten it to the tread-board. On the back or upper side of the bar A is a rib or fin, $b$, which may extend the entire length of the bar, and may be of a width and depth equal to about half the width of said bar, more or less. Near the ends of said rib or fin the metal is widened or deepened, so as to form two extensions or projections, $b^2$.

The strap C is made of a strip of plate or band steel of a width slightly greater and a length considerably greater than that of the bar A. For the greater part of its length it is provided with a slot, $c$, corresponding with the length and width of the rib or fin $b$, and near its ends are two slots or openings, $c^2$, corresponding in shape and dimensions with the two extensions or projections, $b^2$. The ends of the strap C are bent upward and then inward toward each other, so as to form loops or eyes $d$, serving as sockets for the reception of pivots, rods, or bolts, and so as to place the openings $c^2$ in position for engagement with the projections $b^2$.

The slots or openings $c\,c^2$ are just sufficiently smaller than the fin $b$ and extension $b^2$ to prevent them from slipping over said fin and extensions when the strap C is cold.

In order to attach the two parts together to form the link, the strap C is heated so as to expand the slots or openings sufficiently to allow them to slip over the fin and extensions. The strap is then placed in position on the bar A, and allowed to cool. As the metal shrinks in cooling the openings $c\ c^2$ contract around the fin $b$ and extensions $b^2$, fitting closely thereon, and holding the strap firmly secured to the bar.

The links, constructed as above described, are connected in the usual manner to form the endless chain by means of bolts or rods passing through the loops or eyes $d$, and the tread-boards are secured to the upper sides of the links by means of bolts passing through the holes $a^2$.

If the strap should become loose by reason of unequal contraction or expansion of the parts, the position of the tread-board on the link would render displacement of the strap impossible.

Having thus fully described my invention, I claim as new and desire to secure by Letters Patent—

1. An endless-chain link composed of a cast-metal toothed bar provided with a rib or fin, $b$, and extensions $b^2$, and a steel strap provided with slots or openings $c\ c^2$ for engagement with said rib and extensions, and attached to said bar by heating and shrinking, substantially as herein described.

2. In combination with the toothed bar A and its rib or fin $b$ and extensions $b^2$, the strap C, provided with slots or openings for engagement with said rib and extensions, and having its ends bent upward and inward to form the eyes $d$, and pressed downward so as to lie between said bar and the tread-board when attached thereto, substantially as herein described.

EDWARD A. SMITH.

Witnesses:
C. SEDGWICK,
E. R. BROWN.